US011991090B2

(12) United States Patent
Ramanathan et al.

(10) Patent No.: US 11,991,090 B2
(45) Date of Patent: *May 21, 2024

(54) RESOURCE ORCHESTRATION FOR MULTIPLE SERVICES

(71) Applicant: Cisco Technology, Inc., San Jose, CA (US)

(72) Inventors: Shankar Ramanathan, Richardson, TX (US); Nagendra Kumar Nainar, Morrisville, NC (US); Carlos M. Pignataro, Cary, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,345

(22) Filed: Oct. 19, 2022

(65) Prior Publication Data

US 2023/0044088 A1    Feb. 9, 2023

Related U.S. Application Data

(63) Continuation of application No. 17/157,029, filed on Jan. 25, 2021, now Pat. No. 11,539,637.

(51) Int. Cl.
*H04L 47/80*    (2022.01)

(52) U.S. Cl.
CPC .................... *H04L 47/80* (2013.01)

(58) Field of Classification Search
CPC ..................................... H04L 47/80
See application file for complete search history.

(56) References Cited

U.S. PATENT DOCUMENTS 11,218,424 B1 *   1/2022   Hanahan ............... H04L 47/827
2013/0227560 A1 *  8/2013   McGrath ............... G06F 9/5077
                                                              718/1

(Continued)

FOREIGN PATENT DOCUMENTS

CN    109582436 A    4/2019
CN    110780998 A    2/2020

OTHER PUBLICATIONS

Network Service Mesh, "What is Network Service Mesh?", https://networkservicemesh.io/docs/concepts/what-is-nsm, downloaded Jan. 25, 2021, 8 pages.

(Continued)

*Primary Examiner* — Minh Chau Nguyen
(74) *Attorney, Agent, or Firm* — Edell, Shapiro & Finnan, LLC

(57) ABSTRACT

A method of orchestrating one or more radio resources among various services executing within a container. The method includes obtaining, by an orchestration engine executing on a network device, a request, from a first service of a plurality of services, for use of a physical/hardware resource that connects a container running on the network device to a network. The request from the first service has a particular priority. The plurality of services execute within the container. The method further includes determining whether to connect the first service to the network via the physical/hardware resource based on the priority and an availability status of the physical/hardware resource and establishing, at a kernel level, a connection between the first service and the physical/hardware resource based on the determining.

20 Claims, 10 Drawing Sheets

(56) References Cited

U.S. PATENT DOCUMENTS

| | | |
|---|---|---|
| 2016/0036862 A1 | 2/2016 | Bagepalli et al. |
| 2019/0243687 A1* | 8/2019 | Chen ..................... G06F 9/455 |
| 2020/0252376 A1 | 8/2020 | Feng et al. |
| 2021/0014113 A1* | 1/2021 | Guim Bernat ........ H04L 41/042 |
| 2021/0194853 A1* | 6/2021 | Xiao ..................... H04L 43/028 |
| 2021/0194925 A1* | 6/2021 | Xiao ................... H04L 63/0227 |

OTHER PUBLICATIONS

Cisco, "Cisco Network Services Manager 5.0 Data sheet", Document ID: 1473275908925167, https://www.cisco.com/c/en/us/products/collateral/cloud-systems-management/network-services-manager/data_sheet_c78-693133.html, Aug. 11, 2014, 5 pages.

* cited by examiner

US 11,991,090 B2

RESOURCE ORCHESTRATION FOR MULTIPLE SERVICES

CROSS-REFERENCE TO RELATED APPLICATIONS

This application is a continuation of U.S. patent application Ser. No. 17/157,029, filed Jan. 25, 2021, which is incorporated herein by reference in its entirety.

TECHNICAL FIELD

The present disclosure relates to resource orchestration.

BACKGROUND

With the evolution of cloud-native micro-services, multiple network services can now instantiated as lightweight containers or applications that are hosted by a computing node. For example, a container, hosted on an access point (AP), may be configured to run multiple services of different service providers. The container may execute a price service that dynamically changes prices of products in a store and a scanner service that configures hand scanners in the store. Each of these custom services may be instantiated as its own lightweight container or as a customized application. Different container networking options are available that facilitate assigning various resources to each service on a one-to-one basis.

DESCRIPTION OF EXAMPLE EMBODIMENTS

Overview

Figure 1B:
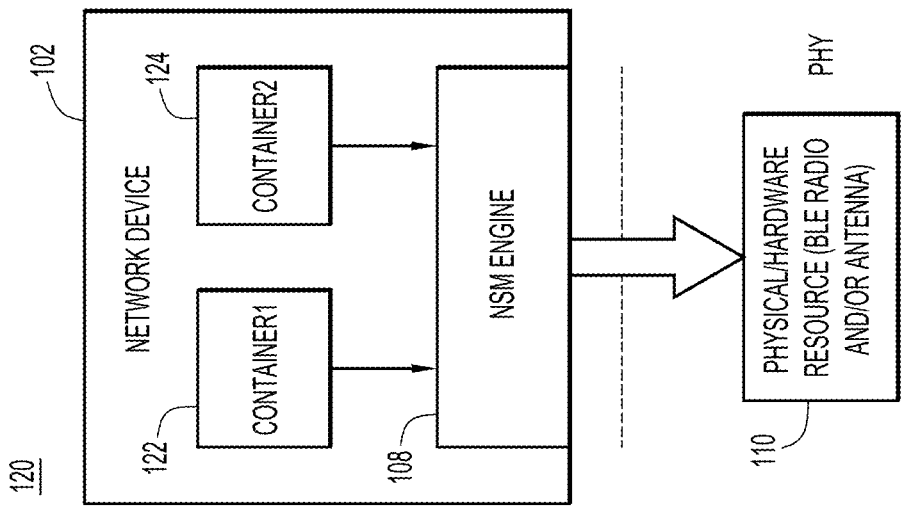
FIGS. 1A and 1B are diagrams illustrating various network architectures in which a physical/hardware resource is shared among various services, according to example embodiments.

Briefly, systems and methods are provided for orchestrating, at a kernel level, one or more physical/hardware resources for use by various services that execute within a container based on an availability of the one or more physical/hardware resources and a priority of the requesting service.

In the systems and methods presented herein, an orchestration engine that executes on a network device, obtains a request, from a first service of a plurality of services, for use of a physical/hardware resource that connects a container running on the network device to a network. The request from the first service has a priority. The plurality of services execute within the container. The method further includes the orchestration engine determining whether to connect the first service to the network via the physical/hardware resource based on the priority and an availability status of the physical/hardware resource. The method also includes establishing, at a kernel level, a connection between the first service and the physical/hardware resource based on the determining.

Example Embodiments

A container is configured to host multiple services. For example, a container may host network services that are instantiated as virtual containers using any of a variety of technologies, such as Docker™ or a Kubernetes™ orchestration system. When a service is instantiated as a virtual container, different container networking options may be available that help to assign a virtual Network Interface Card (vNIC) or configure a dedicated physical network interface card (NIC) to the virtual container so that it can connect to a physical/hardware resource, such as a radio resource. This assignment is on a one-to-one basis. In other words, each service has a set of dedicated resources, such as a dedicated radio resource. A Network Service Mesh (NSM) allows a user to create connectivity for the service and inject the same into the service container. Once the connectivity is provided, the NSM cannot reassign it to another service.

Since multiple services can now be executed as customized applications or as virtual containers within a single container, this leads to resource contention. Moreover, in some constrained environments, resources are not always available on a one-to-one basis. As a result, resource contention also occurs. For example, there may be a resource contention situation when two services need to use a radio resource (e.g., a Bluetooth™ Low Energy (BLE) radio resource) assigned to the container. When the radio resources are limited, the NSM needs to orchestrate between services and reassign resources.

The techniques presented herewith provide for toggling one or more physical/hardware resources between various services based on a priority of the service and status of the one or more physical/hardware resources. In one form, these techniques may be embodied in a NSM engine (NSME) that is an extension of the NSM and is configured to serve as an orchestration engine that performs these operations.

Figure 1A:
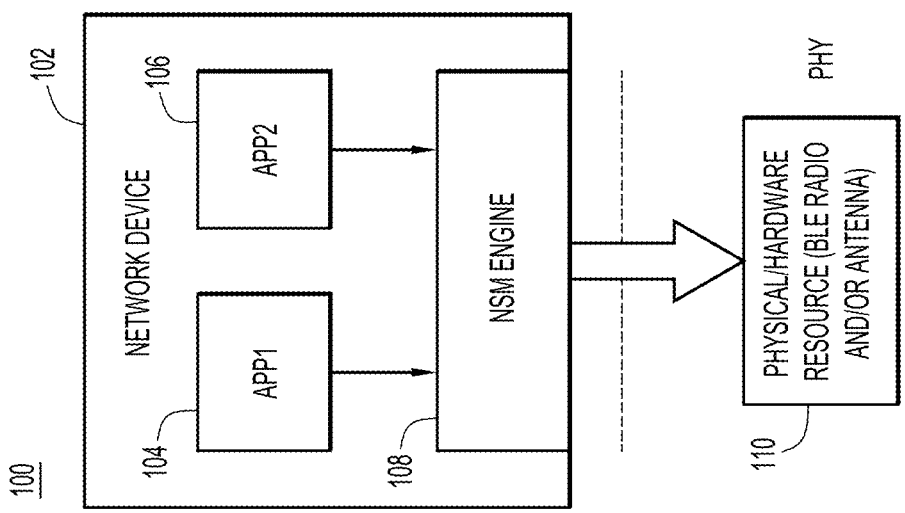

FIGS. 1A and 1B are diagrams illustrating an environment 100 and an environment 120, respectively, in which a physical/hardware resource is orchestrated between various services, according to an example embodiment. In FIGS. 1A and 1B, each of the environments 100 and 120 include a network device 102 and a physical/hardware resource 110.

The network device 102 is a network element or a network node configured to provide connectivity to a network. The network may be a wide variety of networks such as a wide area network, a local access network, or a combination of various networks. The network device 102 is, by way of an example and not by way of a limitation, an access point (AP), a switch, a router, a gateway, etc. The type of the network device 102 depends on a particular configuration and use case scenario. One of ordinary skill in the art would readily appreciate that other components may be present in the network device 102 depending on a particular configuration and use case scenario. These other components are omitted from the description so as not to obscure example embodiments.

The physical/hardware resource 110 is provided by way of an example only and not by way of a limitation. In one form, the physical/hardware resource 110 is a radio resource, such as a radio transceiver in combination with a modem or baseband processor. Other physical level (PHY) resources that may be available for the network device 102 are within the scope of example embodiments. In various example embodiments, physical/hardware resource 110 may include a BLE radio resource and/or an antenna. The number and type of physical resources depend on a particular configuration and use case scenario.

The network device 102 executes a variety of network services. While example embodiments depict two services. The number of services are not limited to two and the number and type of services provided by the network device 102 depend on a particular configuration and use case scenario.

In FIG. 1A, the network device 102 executes two services in a form of a first application 104 (App1) and a second application 106 (App2). In FIG. 1B, the network device 102 executes the two services in a form of a first container 122 and a second container 124. The services may be provided in various forms such as custom applications or virtual containers that are executing within a container, or containers executing within a point of delivery (POD). The services may be provided by different service providers (multiple vendors) and coexist within the same container or POD.

In FIGS. 1A and 1B, the network device 102 further includes an NSME 108. The NSME 108 is an extension of the NSM and inherits characteristics of the NSM, as may be defined for a Kubernetes orchestration implementation. The NSME 108 serves as a scheduler or an orchestration engine that orchestrates resources among competing services based on incoming requests. The NSME 108 acts as an arbitrator, at an application level, between the services and the resources, and in so doing, toggles connectivity, at a kernel level, to one or more resources based on incoming requests and priority-based awareness.

Figure 2B:
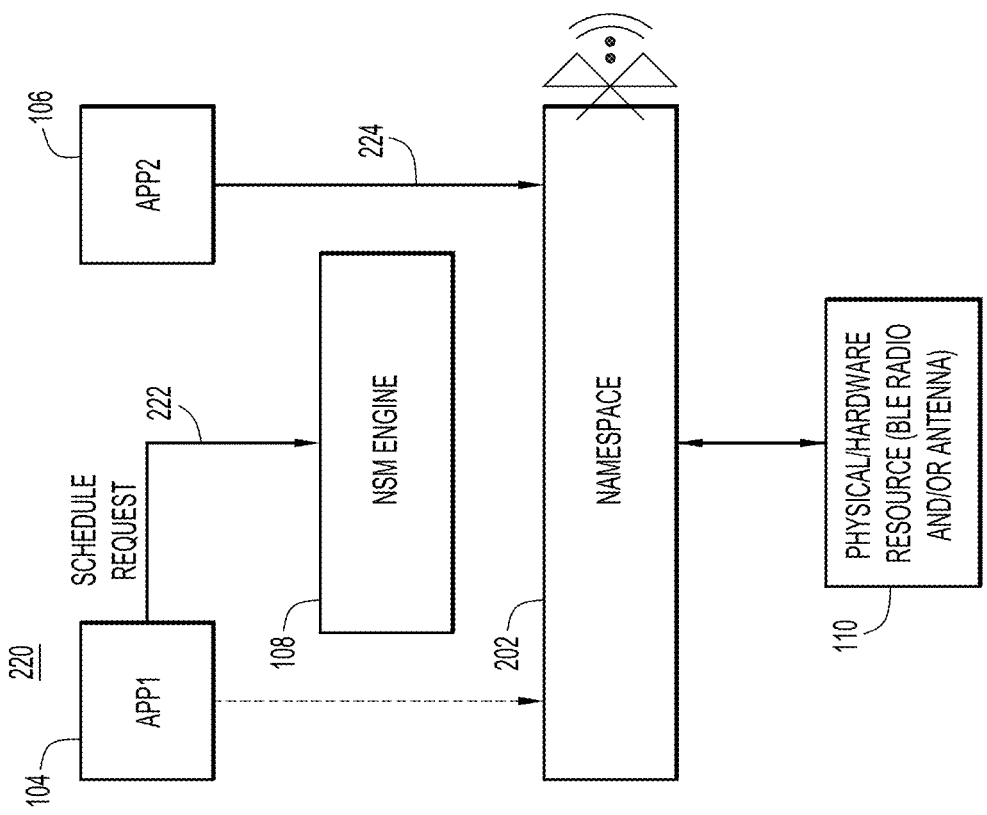
FIGS. 2A and 2B are diagrams illustrating a process of sharing a physical/hardware resource among various services, according to an example embodiment.
Figure 2A:
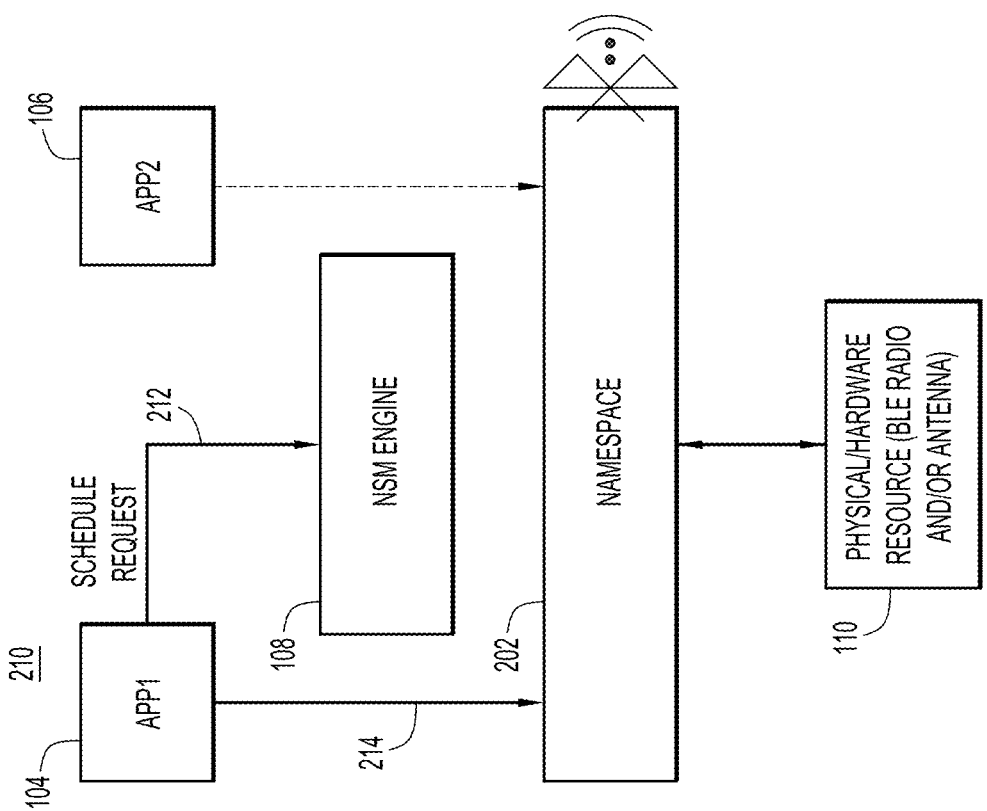

FIGS. 2A and 2B are diagrams illustrating processes for sharing a physical/hardware resource among various services, according to an example embodiment. Services are depicted in a form of the first application 104 and the second application 106 of FIG. 1A. Additionally, a namespace 202 is provided for one or more physical resources, such as the physical/hardware resource 110. A namespace is a set of signs that may be used to identify and refer to objects of various kinds. The namespace 202 ensures that a given set of objects have unique names so that they can be easily identified.

In FIG. 2A, as part of a process 210, at 212, the NSME 108 receives a schedule request for use of the physical/hardware resource 110 from the first application 104. The NSME 108 processes the schedule request by determining an availability status of the requested physical/hardware resource 110 and an associated priority (of the first application 104) when the physical/hardware resource 110 is busy. Since the physical/hardware resource 110 is available, at 214, the NSME 108 injects the first application 104 to the namespace 202 sharing the physical/hardware resource 110.

In FIG. 2B, as part of process 220, at 222, the NSME 108 receives a schedule request for the same physical/hardware resource 110 from the second application 106. The physical/hardware resource 110 is busy. As such, the NSME 108 processes the incoming schedule request based on a priority of the second application 106 and/or the priority of the request. For example, the priority can be embedded within the request or can be programmed into the NSME 108. As another example, the priority may be stored as policies in a memory of the network device 102 or elsewhere and is accessible by the NSME 108. The NSME 108 uses the priority to determine if the request should be deferred/delayed, be rejected, or be preempted when the physical/hardware resource 110 is busy with another service. If the physical/hardware resource 110 is occupied but the priority of the request is high, at 224, the NSME 108 toggles the connectivity to the second application 106 by injecting it to the namespace 202 sharing the physical/hardware resource 110.

The NSME 108 is a real-time scheduler that injects respective services to namespaces sharing physical/hardware resources, such as a BLE radio and/or antenna, based on the request, availability status of the respective resource, and associated priority of the service making the request.

FIGS. 3-7 are sequences flows illustrating various processes of orchestrating the use of a physical resource to various services based on a priority of the request and availability status of the resource, according to various example embodiments.

In FIGS. 3-7, the services are in a form of the first application 104 and the second application 106 of FIGS. 1A, 2A, and 2B. In one example, the first application 104 has a high(er) priority and the second application 106 has a low(er) priority. The NSME 108 executes at an application layer and acts as an arbitrator between the first application 104 and the second application 106 and one or more physical resources.

In the example of FIGS. 3-7, the physical/hardware resource is a BLE resource that includes a BLE Host Layer 302 and a BLE Controller Layer 304. The BLE Host Layer 302 performs generic attribute profile (GATT) functions as well as BLE logical link control and adaption protocol (L2CAP) functions. The BLE Controller Layer 304 performs link layer functions and low energy (LE) PHY functions. The BLE Controller Layer 304 executes firmware that controls the radio hardware. The BLE resource is connected to a kernel 306 (such as Linux operating system kernel) via a BLE virtual wire (BLE vWire) 308. The BLE vWire 308 is injected at the kernel 306, and thus at the kernel level, forming a bridge between the BLE Host Layer 302 of the radio resource and the kernel 306.

The first application 104 has a first vWire (App1 vWire) 310 and the second application 106 has a second vWire (App 2 vWire) 312. Each of the first vWire 310 and the second vWire 312 connects its respective service to the kernel 306.

Figure 3:
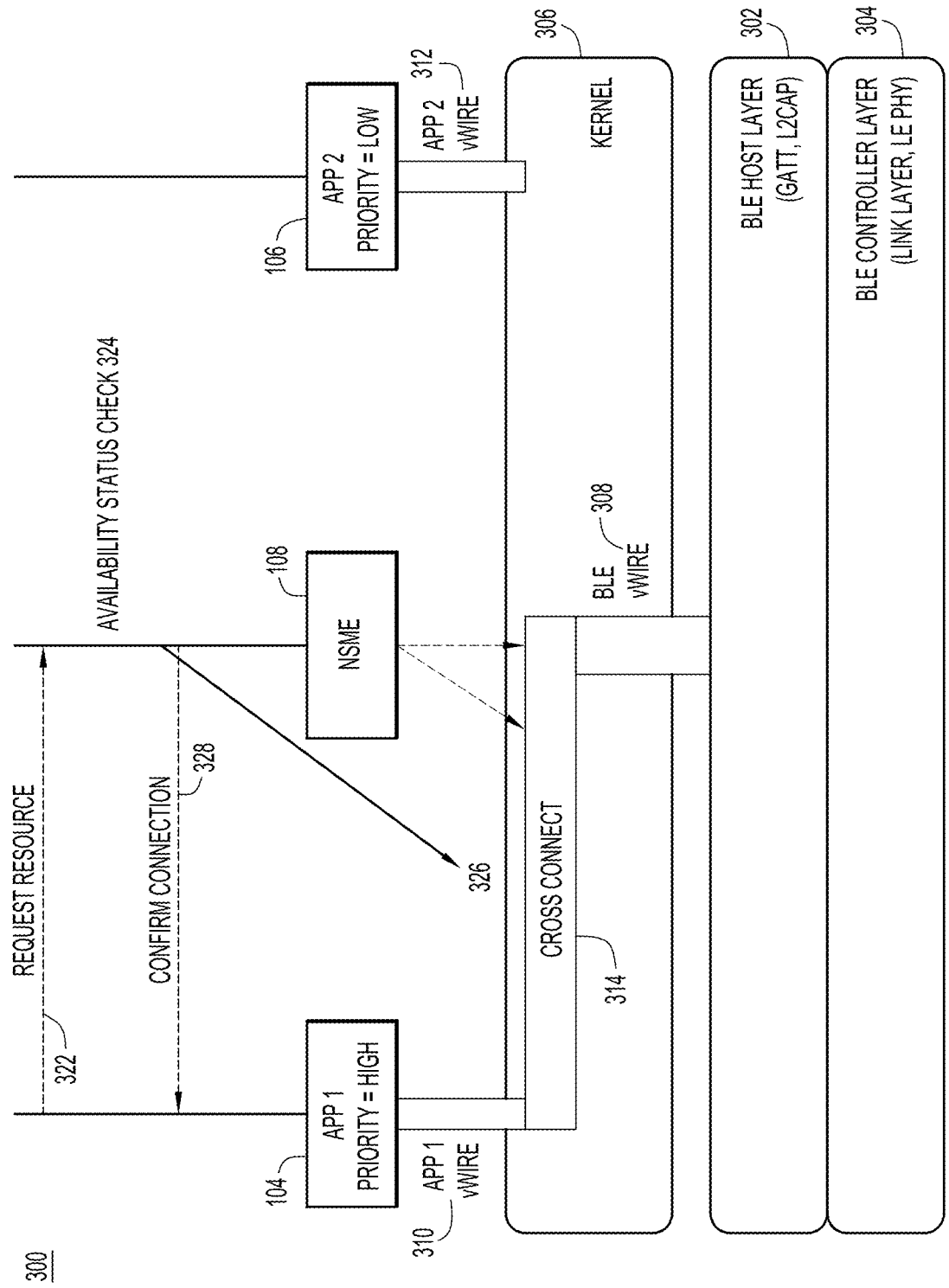
FIG. 3 is a sequence flow depicting a process of orchestrating the use of a physical resource to a high priority service when the resource is available, according to an example embodiment.

FIG. 3 is a sequence flow depicting a process 300 of orchestrating the use of a physical resource to a high(er) priority service when the resource is available, according to an example embodiment.

At 322, the NSME 108 receives a resource request from the first application 104. The request may include, without limitation, one or more of an application type, a priority of the request and/or the first application 104, a type of resource needed.

At 324, the NSME 108 checks the availability status of the radio resource by determining whether the BLE vWire 308 is busy (in use by another service).

Based on determining that the radio resource is available, at 326, the NSME 108 generates a cross connect or a bridge 314 between the BLE vWire 308 of the radio resource and the first vWire 310 of the first application 104, at the kernel 306.

At 328, the NSME 108 sends a confirmation message to the first application 104 indicating that the radio resource is ready for use. The confirmation message may include information indicating that the first application 104 is now connected to the radio resource and optionally, a duration of use for load balancing. The radio resource is released when the first application 104 no longer needs it, the duration expires, and/or a higher priority request preempts the connection.

Figure 4:
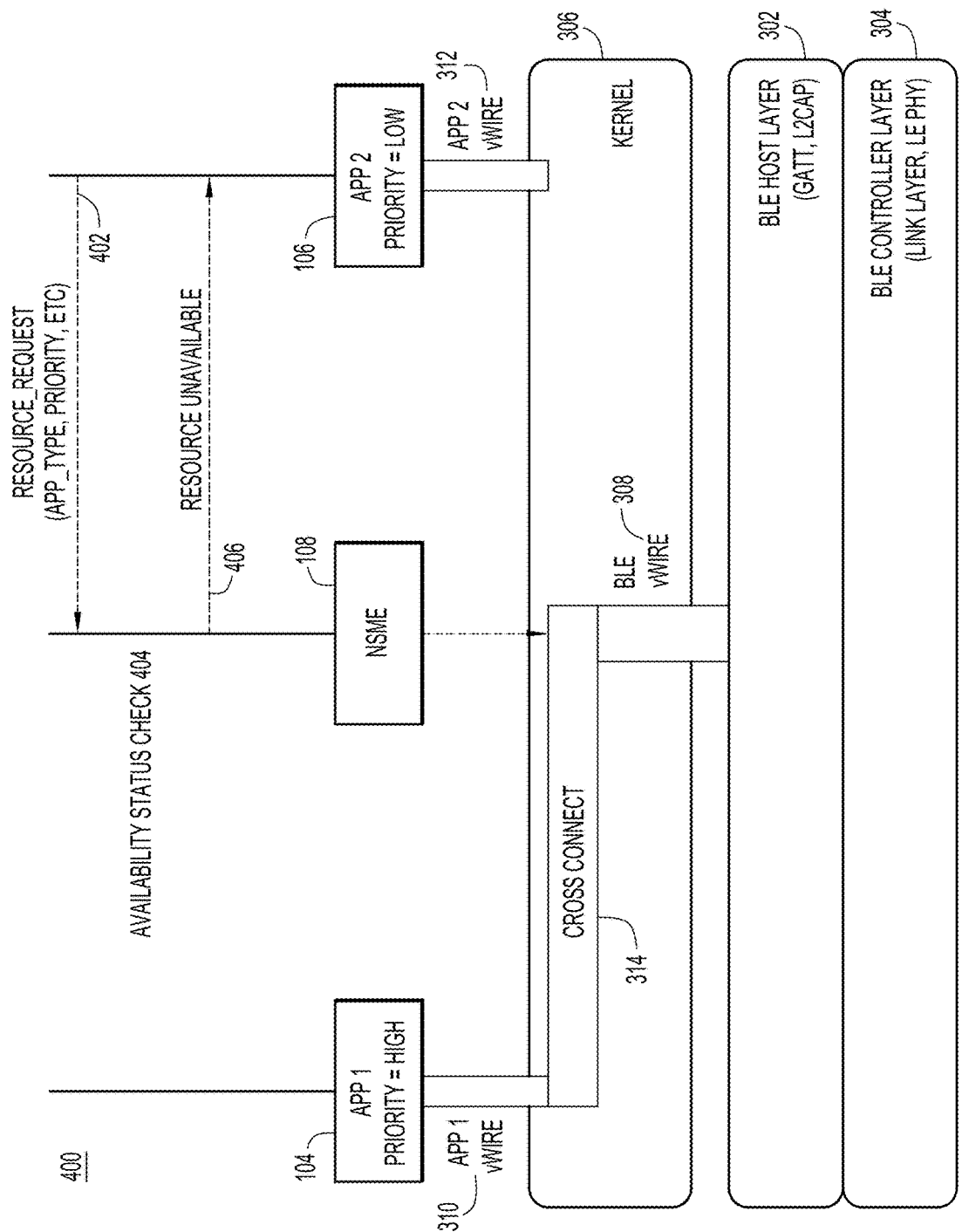
FIG. 4 is a sequence flow depicting a process of rejecting a request, from a low priority service, for use of a physical resource when the resource is busy, according to an example embodiment.

FIG. 4 is a sequence flow depicting a process 400 of rejecting a request for use of a physical resource to a low(er) priority service, according to an example embodiment.

At 402, the NSME 108 receives a request for use of a radio resource from the second application 106. The content of the request is similar to the request of FIG. 3. As noted above, the second application 106 and/or the request has a low(er) priority.

At 404, the NSME 108 checks the availability of the resource. The BLE vWire 308 is in use by the first application 104 that has a higher priority than the priority of the second application 106. As such, the NSME 108 detects the bridge 314 between the BLE vWire 308 and the first vWire 310. Since a connection of higher priority exists, the NSME 108 determines that, at this time, the request from the second application 106 needs to be rejected or placed in a waiting queue.

Accordingly, at 406, the NSME 108 sends a rejection message indicating that the physical resource is not available to the second application 106.

Figure 5:
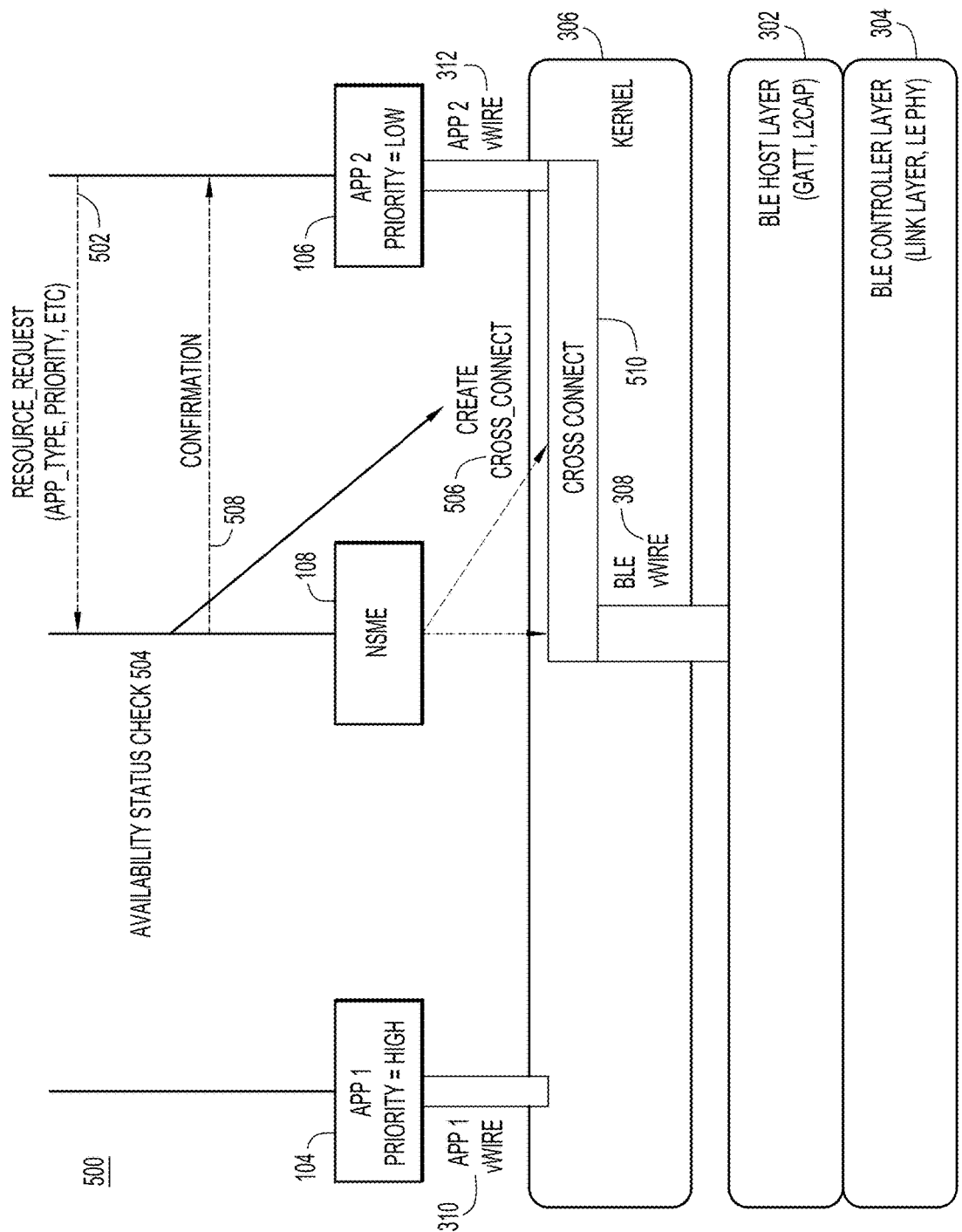
FIG. 5 is a sequence flow depicting a process of orchestrating the use of a physical resource to a low priority service when the resource is available, according to an example embodiment.

FIG. 5 is a sequence flow illustrating a process 500 of orchestrating the use of a physical resource to a low(er) priority service when the resource is available, according to an example embodiment.

At 502, the NSME 108 receives a request (similar to the request of FIG. 3) for use of the resource from the second application 106.

At 504, the NSME 108 checks the availability status of the resource. Since the BLE vWire 308 of the resource is free, at 506, the NSME 108 establishes a cross connect or a bridge 510, at the kernel 306, connecting the second vWire 312 to the BLE vWire 308.

At 508, the NSME 108 sends a confirmation message (similar to the conformation message of FIG. 3) to the second application 106.

Figure 6:
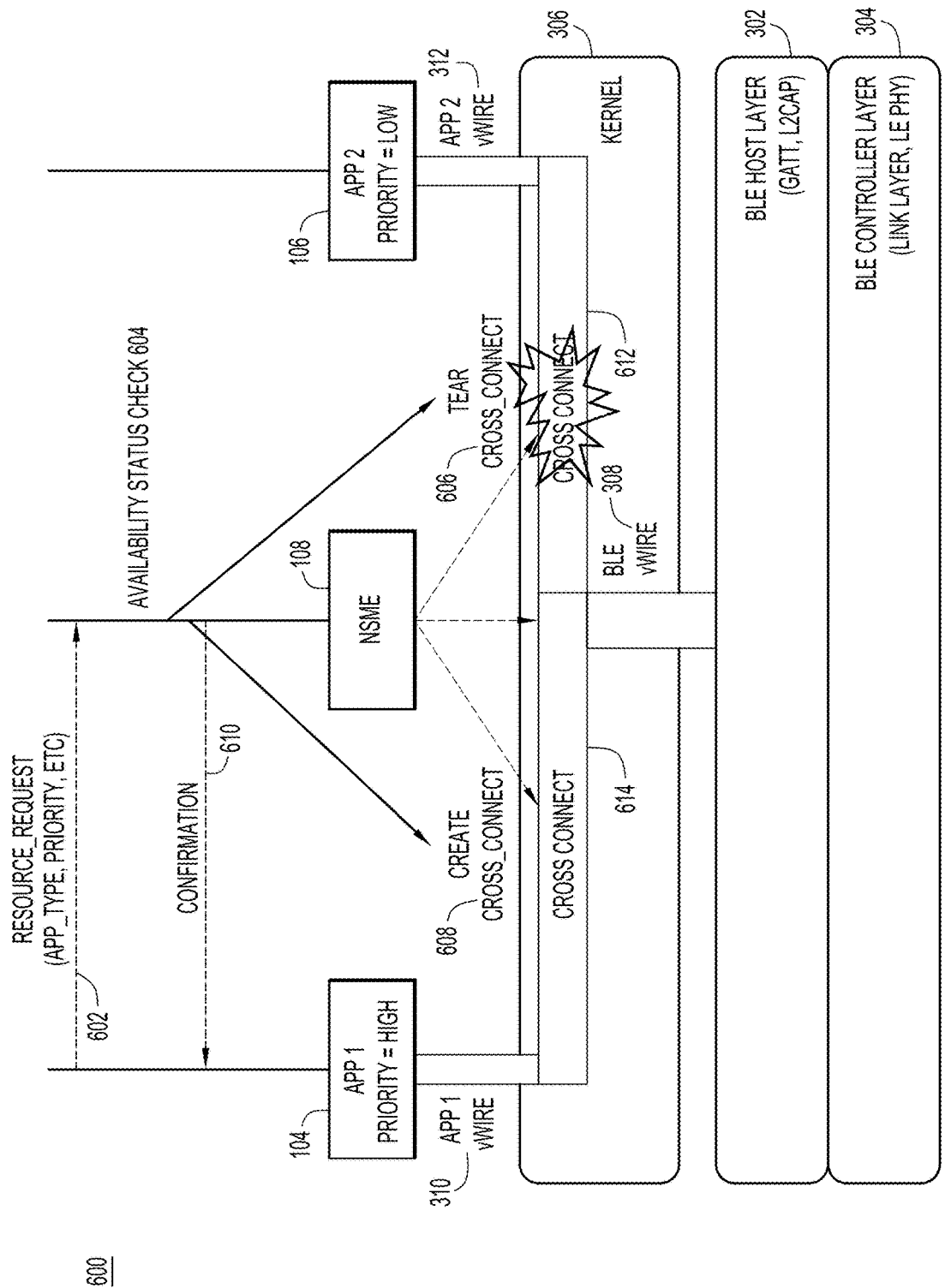
FIG. 6 is a sequence flow depicting a process of orchestrating the use of a physical resource to a high priority service when the resource is busy, according to an example embodiment.

FIG. 6 is a sequence flow illustrating a process 600 of orchestrating a physical resource to a high(er) priority service when the resource is busy, according to an example embodiment.

At 602, the NSME 108 receives a request for use of the resource from the first application 104.

At 604, the NSME 108 checks the availability status of the resource. The BLE vWire 308 is occupied by the second application 106. That is, the NSME 108 detects an existing bridge 612 between the BLE vWire 308 and the second vWire 312. The NSME 108 checks the priority of the second application 106 and determines that it has a lower priority than the current request from the first application 104.

Accordingly, at 606, the NSME 108 tears down the existing bridge 612.

At 608, the NSME 108 establishes a new bridge 614 connecting the BLE vWire 308 to the first vWire 310 of the first application 104.

At 610, the NSME 108 sends a confirmation message (similar to the confirmation message of FIG. 3) to the first application 104. Optionally, the NSME 108 sends another message to the second application 106 indicating that its connection has been preempted by a higher priority service or indicating that the second application 106 needs to wait until the connection can be reestablished.

Figure 7:
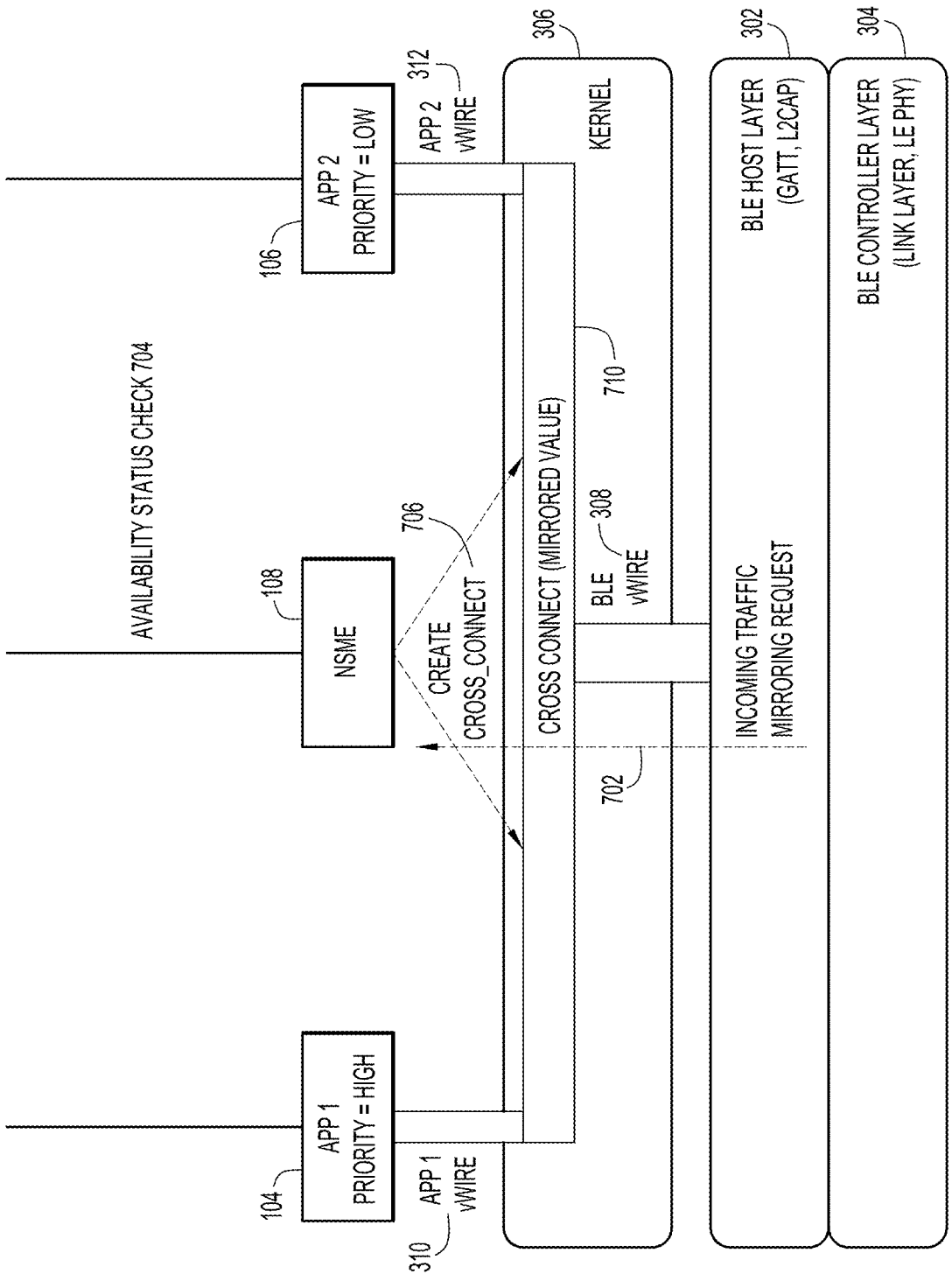
FIG. 7 is a sequence flow depicting a process of sharing the use of a physical resource by a plurality of services based on a traffic-mirroring request, according to an example embodiment.

FIG. 7 is a sequence flow illustrating a process 700 of sharing the use of a physical resource by a plurality of services based on a traffic-mirroring request, according to an example embodiment.

At 702, the NSME 108 receives an incoming traffic-mirroring request from the physical resource, via the BLE Host Layer 302.

At 704, the NSME 108 checks whether the resource is available. If the resource is busy, the priority of the incoming mirroring request and/or the physical resource is determined and compared with the priority of the existing connection.

If the resource is available or the priority of the incoming mirroring request is higher than the existing connection, at 706, the NSME 108 establishes a cross connect or a bridge 710 that connects all services (the first vWire 310 and the second vWire 312) to the BLE vWire 308. Optionally, a confirmation message indicating that the connection has been established may be provided to the BLE Host Layer 302.

Figure 8:
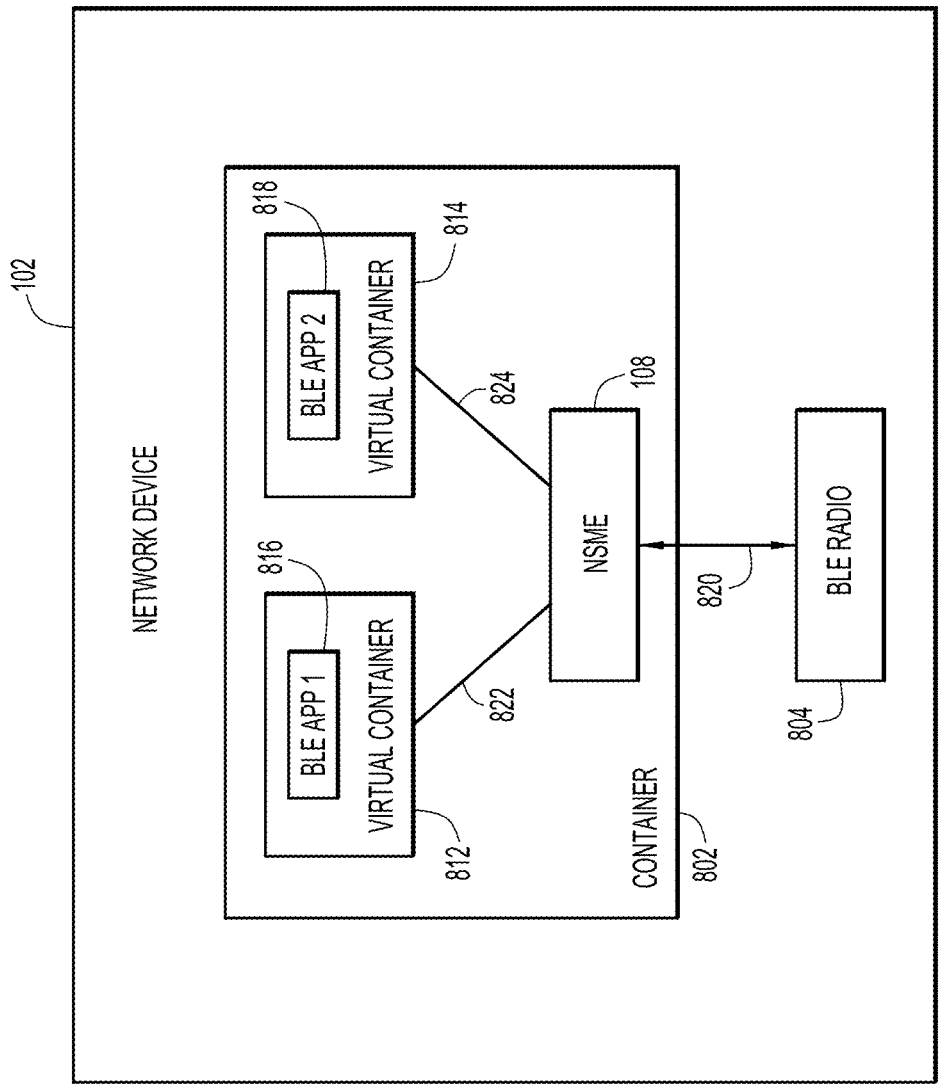
FIG. 8 is a diagram illustrating an environment in which an orchestration engine is installed inside a container, according to another example embodiment.

FIG. 8 is a diagram illustrating an environment 800 in which an orchestration engine is installed inside a container, according to an example embodiment. In the environment 800, the network device 102 is an access point (AP), as an example. The network device 102 hosts a container 802 and one or more physical/hardware resources such as a BLE radio 804.

The container 802 hosts a first virtual container 812 and a second virtual container 814 therein. Each service is instantiated inside a respective virtual container and includes a BLE application. That is, a first service (BLE App1) 816 is instantiated inside the first virtual container 812 and a second service (BLE App 2) 818 is instantiated inside the second virtual container 814. The first and second virtual containers 812 and 814 are contending for the BLE radio 804.

To avoid this contention, the NSME 108 acts as a smart Container Network Interface scheduler inside the container 802. The NSME 108 enables full NSM orchestration functionality within the application layer and within the same container i.e., the container 802.

The NSME 108 has a network interface 820 to the BLE radio 804. The NSME 108 may further generate a Container Network Interface (CNI) cloud for every application installed and to each virtual container i.e., a first CNI cloud 822 to the first virtual container 812 and a second CNI cloud 824 to the second virtual container 814. The NSME 108 then becomes the sole interface/pipe for the first service 816 and the second service 818 to the BLE radio 804.

As explained above, each of the first service 816 and the second service 818 is assigned a priority, which may be provided during instantiation of the container 802. The priority may be based on an equal-load sharing or a preference for one application over another.

According to another example embodiment, a POD may be provided that hosts multiple containers executing various services. The NSME 108 can be instantiated as a container within POD during the time of POD instantiation and then leverage the NSM capability to arbitrate one or more physical/hardware resources by toggling or injecting a virtual wire into the respective container that hosts a service.

According to various example embodiments, in case of contention for one or more physical resources, the NSME 108 is configured to load-balance access to the BLE radio across various services and/or prioritize the use of the BLE radio interface for one service over another service. Also, the NSME 108 is configured to mirror the BLE radio interface across various services. As a result, resource contention issues are resolved even when multiple services are installed in the same container. Additionally, the NSME 108 restricts various services from over-subscribing to one or more physical resources.

According to various example embodiments, a new extension of the NSM that inherits the characteristics of the NSM defined for Kubernetes, for example, is provided in a form of an orchestration engine. The orchestration engine acts as a real-time scheduler that injects the respective service to the namespace sharing the one or more physical resources based on the scheduler request and an associated priority.

Figure 9:
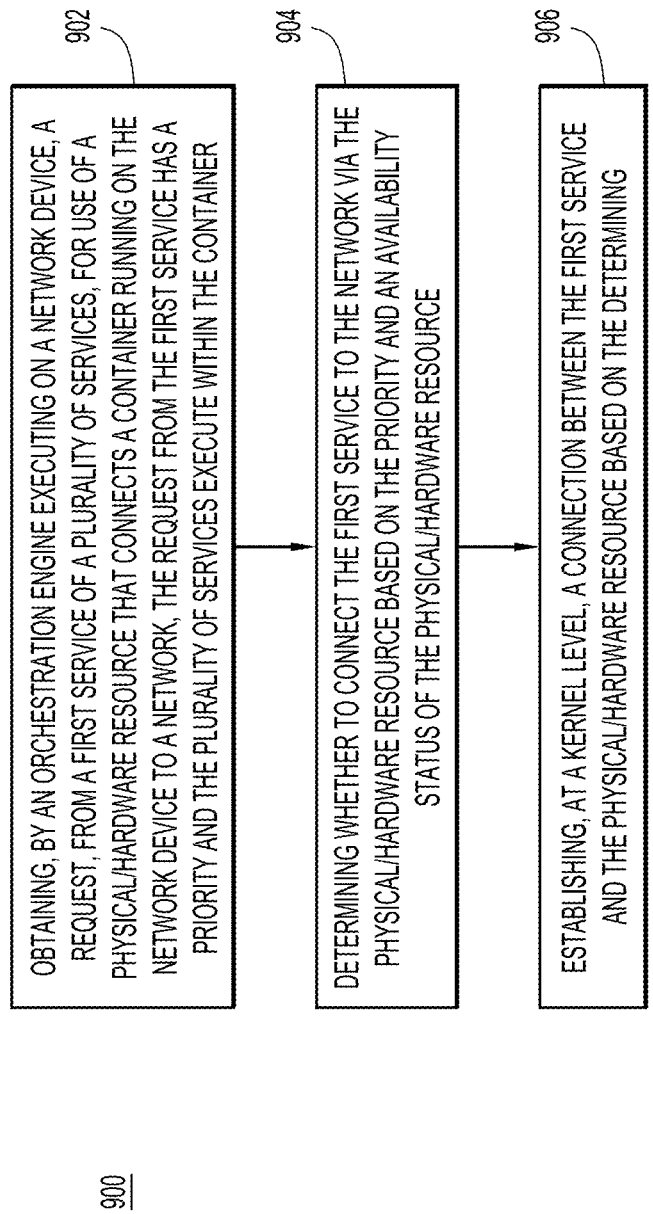
FIG. 9 is a flowchart illustrating a method of orchestrating one or more physical resources among a plurality of services, according to an example embodiment.

FIG. 9 is a flow chart illustrating a method 900 of orchestrating one or more physical resources among a plurality of services, according to an example embodiment. The method 900 is performed by an orchestration engine such as the NSME 108 of FIGS. 1A-8 executing on a network device of FIGS. 1A, 1B, and 8.

At 902, an orchestration engine, executing on a network device, obtains a request, from a first service of a plurality of services, for use of a physical/hardware resource that connects a container running on the network device to a network. In one form, the physical/hardware resource is a radio resource. The request from the first service has a priority and the plurality of services execute within the container.

At 904, the orchestration engine determines whether to connect the first service to the network via the physical/hardware resource based on the priority and an availability status of the physical/hardware resource.

At 906, the orchestration engine establishes, at a kernel level, a connection between the first service and the physical/hardware resource based on the determining performed at 904.

In one form, the operation 904 may include determining that the availability status of the physical/hardware resource is available or that the priority of the first service is greater than a priority of a second service that is using the physical/hardware resource.

According to one or more example embodiments, the operation 906 may include generating a bridge, at the kernel level, between the first service and a virtual wire that connects the container to a host layer of the physical/hardware resource.

The method 900 may further include generating, for each of the plurality of services, a container network interface to the orchestration engine such that the orchestration engine arbitrates a plurality of requests, from the plurality of services, for one or more physical/hardware resources of the network device. The plurality of services may include one or more of an application or a virtual container.

According to one or more example embodiments, the physical hardware resource may be a radio resource and the operation 906 may include, based on the availability status of the radio resource being available, generating a first bridge, at the kernel level, between the first service and a virtual wire that connects to a host layer of the radio resource. The operation 906 may further include, based on the priority of the request being higher than a priority of a second service using the radio resource, tearing down a second bridge between the second service and the virtual wire and generating the first bridge between the first service and the virtual wire.

In one instance, the operation 904 may include, based on determining that the priority of the second service is higher than the priority of the first service and the availability status of the radio resource being occupied by the second service, rejecting the request.

According to one or more example embodiments, the method 900 may further include obtaining, from the physical/hardware resource, by the orchestration engine, an incoming traffic-mirroring request and generating a bridge from each of the plurality of services to a virtual wire that connects the container to a host layer of the physical/hardware resource.

In another form, the method 900 may further include obtaining the priority based on one or more of a request type, a service type, or at least one policy and selecting the physical/hardware resource from one or more physical/hardware resources based on information in the request and availability states of the one or more physical/hardware resources.

According to one or more example embodiments, the method 900 may further include toggling a bridge to a virtual wire that connects the container to a host layer of the physical/hardware resource, from the first service to another service of the plurality of services based on the request, the availability status of the physical/hardware resource, and the priority.

Figure 10:
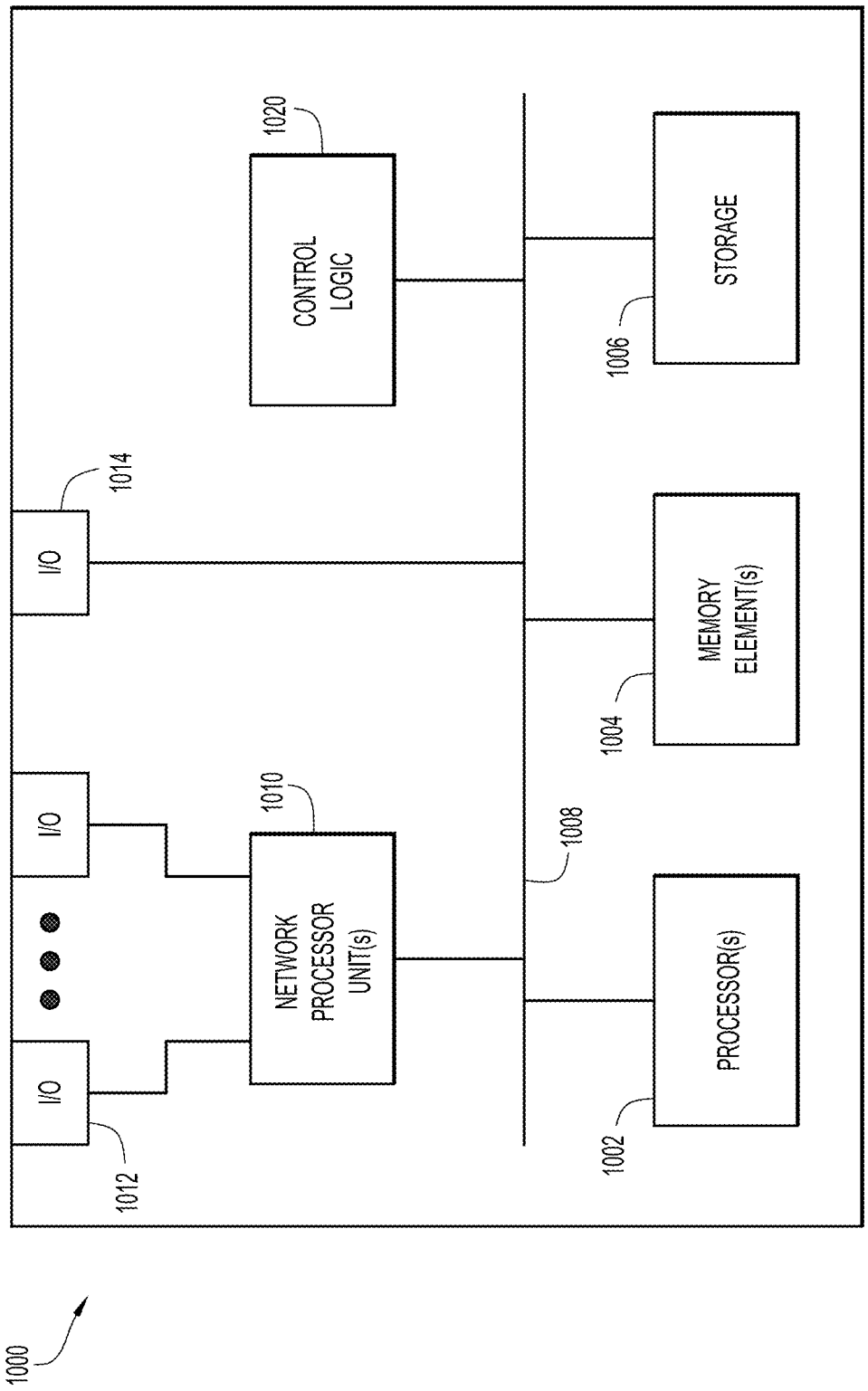
FIG. 10 is a hardware block diagram of a computing device configured to orchestrate one or more physical resources among a plurality of services, according to an example embodiment.

FIG. 10 is a hardware block diagram of a computing device 1000 configured to orchestrate one or more physical/hardware resources among a plurality of services, according to various example embodiments. The computing device 1000 may perform the functions discussed herein in connection with the techniques depicted in FIGS. 1A-9. In one example, the computing device 1000 is generally representative of a network device referred herein and executes an orchestration engine described above.

In at least one embodiment, computing device 1000 may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for computing device 1000 can overlap in any manner and are not limited to the specific allocation of instructions and/or operations described herein.

In at least one embodiment, processor(s) 1002 is/are at least one hardware processor configured to execute various tasks, operations and/or functions for computing device 1000 as described herein according to software and/or instructions configured for computing device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, one or more memory element(s) 1004 and/or storage 1006 is/are configured to store data, information, software, and/or instructions associated with computing device 1000, and/or logic configured for memory element(s) 1004 and/or storage 1006. For example, any logic described herein (e.g., control logic 1020) can, in various embodiments, be stored for computing device 1000 using any combination of memory element(s) 1004 and/or storage 1006. Note that in some embodiments, storage 1006 can be consolidated with one or more memory elements 1004 (or vice versa), or can overlap/exist in any other suitable manner.

In at least one embodiment, bus 1008 can be configured as an interface that enables one or more elements of computing device 1000 to communicate in order to exchange information and/or data. Bus 1008 can be implemented with any architecture designed for passing control, data and/or information between processors, memory elements/storage, peripheral devices, and/or any other hardware and/or software components that may be configured for computing device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between computing device 1000 and other systems, entities, etc., via network I/O interface(s) 1012 to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 1000 and other systems, entities, etc. to facilitate operations for various embodiments described herein. In various embodiments, network I/O interface(s) 1012 can be configured as one or more Ethernet port(s), Fibre Channel ports, and/or any other I/O port(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to computer device 1000. For example, I/O interface(s) 1014 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

In still another example embodiment, an apparatus is a network device of FIG. 1A, 1B, or 8. The apparatus includes a communication interface configured to enable network communications, a memory configured to store executable instructions, and a processor coupled to the communication interface and the memory. The processor is configured to perform operations that include obtaining a request, from a first service of a plurality of services, for use of a physical/hardware resource that connects a container running on the apparatus to a network. The request from the first service has a priority and the plurality of services execute within the container. The operations further include determining whether to connect the first service to the network via the physical/hardware resource based on the priority and an availability status of the physical/hardware resource and establishing, at a kernel level, a connection between the first service and the physical/hardware resource based on determining.

According to one or more example embodiments, the processor may further be configured to perform the operation of determining whether to connect the first service to the network by determining that the priority of the first service is greater than a priority of a second service that is using the physical/hardware resource.

In one form, the processor may further be configured to perform the operation of establishing a connection by generating a bridge, at the kernel level, between the first service and a virtual wire that connects the container to a host layer of the physical/hardware resource.

In one instance, the processor may further be configured to perform an additional operation of generating, for each of the plurality of services, a container network interface to an orchestration engine executed by the processor such that the orchestration engine arbitrates a plurality of requests, from the plurality of services, for one or more physical/hardware resources of the apparatus. The plurality of services include one or more of an application or a virtual container.

According to one or more example embodiments, the physical/hardware resource may be a radio resource and the processor may further be configured to perform the operation of establishing the connection by, based on the availability status of the radio resource being available, generating a first bridge, at the kernel level, between the first service and a virtual wire that connects to a host layer of the radio resource and by, based the priority of the request being higher than a priority of a second service using the radio resource, tearing down a second bridge between the second service and the virtual wire and generating the first bridge between the first service and the virtual wire.

In one form, the processor may further be configured to perform the operation of determining by, based on determining that the priority of the second service is higher than the priority of the first service and the availability status of the radio resource being occupied by the second service, rejecting the request.

According to one or more example embodiments, the processor may further be configured to perform additional operations that include obtaining, from the physical/hardware resource by the orchestration engine, an incoming traffic-mirroring request and generating a bridge from each of the plurality of services to a virtual wire that connects the container to a host layer of the physical/hardware resource.

According to one or more example embodiments, the processor may further be configured to perform additional operations that include obtaining the priority based on one or more of a request type, a service type, or at least one policy and selecting the physical/hardware resource from one or more physical/hardware resources based on information in the request and availability statuses of the one or more physical/hardware resources.

In another form, the processor may further be configured to perform additional operation that includes toggling a bridge to a virtual wire that connects the container to a host layer of the physical/hardware resource, from the first service to another service of the plurality of services based on the request, the availability status of the physical/hardware resource, and the priority.

In yet another example embodiment, one or more non-transitory computer readable storage media encoded with instructions are provided. When the media is executed by the processor, the instructions cause the processor to perform the operations including obtaining a request, from a first service of a plurality of services, for use of a physical/hardware resource that connects a container running on a network device to a network. The request from the first service has a priority and the plurality of services execute within the container. The operations further include determining whether to connect the first service to the network via the physical/hardware resource based on the priority and an availability status of the physical/hardware resource and establishing, at a kernel level, a connection between the first service and the physical/hardware resource based on the determining.

In one instance, the instructions may further cause the processor to determine whether to connect the first service to the network by determining that the priority of the first service is greater than a priority of a second service that is using the physical/hardware resource.

According to one or more example embodiments, the instructions may further cause the processor to establish the connection by generating a bridge, at the kernel level, between the first service and a virtual wire that connects the container to a host layer of the physical/hardware resource.

In one form, the instruction may further cause the processor to perform an additional operation of generating, for each of the plurality of services, a container network interface to an orchestration engine executing on the processor such that the orchestration engine arbitrates a plurality of requests, from the plurality of services, for one or more physical/hardware resources of the network device. The plurality of services include one or more of an application or a virtual container.

According to one or more example embodiments, the physical/hardware resource may be a radio resource and the instructions may further cause the processor to perform the operation of establishing the connection by, based on the availability status of the radio resource being available, generating a first bridge, at the kernel level, between the first service and a virtual wire that connects to a host layer of the radio resource and by, based the priority of the request being higher than a priority of a second service using the radio resource, tearing down a second bridge between the second service and the virtual wire and generating the first bridge between the first service and the virtual wire.

According to one or more example embodiments, the instructions may further cause the processor to perform the determining operation by, based on determining that the priority of the second service is higher than the priority of the first service and the availability status of the radio resource being occupied by the second service, rejecting the request.

In one instance, the instructions may further cause the processor to perform additional operations including obtaining, from the physical/hardware resource by the orchestration engine, an incoming traffic-mirroring request and generating a bridge from each of the plurality of services to a virtual wire that connects the container to a host layer of the physical/hardware resource.

According to one or more example embodiments, the instructions may further cause the processor to perform additional operations including obtaining the priority based on one or more of a request type, a service type, or at least one policy and selecting the physical/hardware resource from one or more physical/hardware resources based on information in the request and availability statuses of the one or more physical/hardware resources.

In one form, the instructions may further cause the processor to perform additional operations including toggling a bridge to a virtual wire that connects the container to a host layer of the physical/hardware resource, from the first service to another service of the plurality of services based on the request, the availability status of the physical/hardware resource, and the priority.

In yet another example embodiment, a system is provided that includes the network device and operations explained above with reference to FIGS. 1A-9.

The programs described herein (e.g., control logic 1020) may be identified based upon the application(s) for which they are implemented in a specific embodiment. However, it should be appreciated that any particular program nomenclature herein is used merely for convenience, and thus the embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, the storage 1006 and/or memory elements(s) 1004 can store data, software, code, instructions (e.g., processor instructions), logic, parameters, combinations thereof, and/or the like used for operations described herein. This includes the storage 1006 and/or memory elements(s) 1004 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein, the terms may be used in a generic sense to include packets, frames, segments, datagrams, and/or any other generic units that may be used to transmit communications in a network environment. Generally, the terms reference to a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining, by an orchestration engine executing on a network device, a request, from a first service of a plurality of services that are executing within a container, for use of a physical/hardware resource that connects the container running on the network device to a network;
   determining whether to connect the first service to the network via the physical/hardware resource based on the request; and
   establishing, at a kernel level, a connection between the first service from among the plurality of services executing in the container and the physical/hardware resource based on determining to connect the first service.

2. The method of claim 1, wherein establishing the connection includes:
   generating a bridge, at the kernel level, between the first service and a virtual wire that connects the container to a host layer of the physical/hardware resource.

3. The method of claim 2, further comprising:
   generating, for each of the plurality of services, a container network interface to the orchestration engine such that the orchestration engine arbitrates a plurality of requests, from the plurality of services, for one or more physical/hardware resources of the network device, wherein the plurality of services include one or more of an application or a virtual container.

4. The method of claim 1, wherein the physical/hardware resource is a radio resource and establishing the connection includes:
   based on the radio resource being available, generating a first bridge, at the kernel level, between the first service and a virtual wire that connects to a host layer of the radio resource.

5. The method of claim 1, further comprising:
   obtaining, from the physical/hardware resource by the orchestration engine, an incoming traffic-mirroring request; and
   generating a bridge from each of the plurality of services to a virtual wire that connects the container to a host layer of the physical/hardware resource.

6. The method of claim 1, further comprising:
   selecting the physical/hardware resource from one or more physical/hardware resources based on availability states of the one or more physical/hardware resources and information in the request.

7. The method of claim 1, further comprising:
   toggling a bridge to a virtual wire that connects the container to a host layer of the physical/hardware resource, from the first service to another service of the plurality of services based on the request.

8. The method of claim 1, wherein establishing, at the kernel level, the connection between the first service and the physical/hardware resource includes:
   injecting the first service into a namespace that involves a set of signs to identify objects within the container.

9. The method of claim 1, wherein establishing, at the kernel level, the connection between the first service and the physical/hardware resource includes:
   injecting a virtual wire at the kernel level to form a bridge between a host layer of the physical/hardware resource and the first service.

10. The method of claim 1, wherein the physical/hardware resource is shared among the plurality of services executing within the container by injecting a virtual wire at the kernel level to establish the connection between a respective service from among the plurality of services.

11. An apparatus comprising:
    a memory;
    a network interface configured to enable network communications; and
    a processor, wherein the processor is configured to perform operations comprising:
       obtaining a request, from a first service of a plurality of services that are executing within a container, for use of a physical/hardware resource that connects the container running on the apparatus to a network;
       determining whether to connect the first service to the network via the physical/hardware resource based on the request; and
       establishing, at a kernel level, a connection between the first service from among the plurality of services executing in the container and the physical/hardware resource based on determining to connect the first service.

12. The apparatus of claim 11, wherein the processor is configured to perform the operation of establishing the connection by:
    generating a bridge, at the kernel level, between the first service and a virtual wire that connects the container to a host layer of the physical/hardware resource.

13. The apparatus of claim 12, wherein the processor is further configured to perform an additional operation comprising:
    generating, for each of the plurality of services, a container network interface to an orchestration engine executed by the processor such that the orchestration engine arbitrates a plurality of requests, from the plurality of services, for one or more physical/hardware resources of the apparatus, wherein the plurality of services include one or more of an application or a virtual container.

14. The apparatus of claim 11, wherein the physical/hardware resource is a radio resource and the processor is configured to perform the operation of establishing the connection by:

based on the radio resource being available, generating a first bridge, at the kernel level, between the first service and a virtual wire that connects to a host layer of the radio resource.

15. The apparatus of claim 11, wherein the processor is further configured to perform an additional operation comprising:

obtaining, from the physical/hardware resource, an incoming traffic-mirroring request; and generating a bridge from each of the plurality of services to a virtual wire that connects the container to a host layer of the physical/hardware resource.

16. The apparatus of claim 11, wherein the processor is further configured to perform an additional operation comprising:

selecting the physical/hardware resource from one or more physical/hardware resources based on availability states of the one or more physical/hardware resources and information in the request.

17. The apparatus of claim 11, wherein the processor is further configured to perform an additional operation comprising:

toggling a bridge to a virtual wire that connects the container to a host layer of the physical/hardware resource, from the first service to another service of the plurality of services based on the request.

18. One or more non-transitory computer readable storage media encoded with instructions that, when executed by a processor, cause the processor to perform operations including:

obtaining a request, from a first service of a plurality of services that are executing within a container, for use of a physical/hardware resource that connects the container running on a network device to a network;

determining whether to connect the first service to the network via the physical/hardware resource based on the request; and establishing, at a kernel level, a connection between the first service from among the plurality of services executing in the container and the physical/hardware resource based on determining to connect the first service.

19. The one or more non-transitory computer readable storage media according to claim 18, wherein the instructions cause the processor to establish the connection by:

generating a bridge, at the kernel level, between the first service and a virtual wire that connects the container to a host layer of the physical/hardware resource.

20. The one or more non-transitory computer readable storage media according to claim 19, wherein the instructions cause the processor to perform an additional operation comprising:

generating, for each of the plurality of services, a container network interface to an orchestration engine executing on the processor such that the orchestration engine arbitrates a plurality of requests, from the plurality of services, for one or more physical/hardware resources of the network device, wherein the plurality of services include one or more of an application or a virtual container.

* * * * *